Feb. 6, 1962 M. H. LEWIN 3,019,981

BINARY ADDER EMPLOYING NEGATIVE RESISTANCE ELEMENTS

Filed May 28, 1959

INVENTOR.
MORTON H. LEWIN
BY John V. Regan
ATTORNEY 3,019,981
BINARY ADDER EMPLOYING NEGATIVE RESISTANCE ELEMENTS Morton H. Lewin, Princeton, N.J., assignor to Radio Corporation of America, a corporation of Delaware
Filed May 28, 1959, Ser. No. 816,479
13 Claims. (Cl. 235—176)

This invention relates generally to information handling circuits and more particularly to a full adder circuit.

A basic calculation performed by electronic digital computers is the addition of two multidigit binary numbers, wherein the binary digits are represented by voltage or current pulses in a given time space. Such a representation is known as pulse amplitude code. Whether the two binary numbers are added in parallel, that is, simultaneously, or in serial time sequence, the two lowest order digits may be first added to produce a sum and a carry, the carry then being presented for addition to the next lowest-order pair of digits. Complete addition thus requires three binary input channels, respectively, for the two binary digits and the carry from the preceding addition, and two binary output channels, respectively, for the sum and carry digits, in a circuit which is commonly called a full binary adder. Prior art full adder circuits normally employ a plurality of interconnected logic circuits to achieve full adder operation. For very high speed operation, these logic circuits may so attenuate the input pulses that amplification is needed. Time delays through amplifiers may then be intolerably long for high speed operation of the circuit.

It is an object of the present invention to provide a novel and improved high speed full adder circuit.

Another object of the present invention is to provide a full adder circuit which is reliable in operation and which has low power requirements.

Still another object of the present invention is to provide a full adder circuit adapted to handle digital information expressed in pulse amplitude code.

A further object of the present invention is to provide a novel and improved full adder circuit wherein binary addition is achieved in one stage of operation.

An adder according to the invention, includes in a first circuit branch, a pair of negative resistance semiconductor devices series connected in the same sense. In a second circuit branch, a further negative resistance semiconductor device and a resistor element are connected in series. The two circuit branches are connected in parallel in a manner such that each of the devices is poled in the same direction from a terminal of the parallel circuit. Energizing signals and a plurality of pulse type binary signals are simultaneously applied to the circuit, and a sum output signal is derived across the resistor element.

The circuit includes still another negative resistance semiconductor device in a bistable circuit. To this other semiconductor device, the pulse type binary signals and energizing signals are applied. The amplitude of the energizing signals are adjusted so that the circuit switches from one of its stable states to the other of its stable states when, and only when, two or more binary input signals are simultaneously applied thereto.

In the accompanying figures:

FIGURES 1, 3 and 5 are schematic diagrams of simplified circuits utilizing negative resistance type semiconductor diodes which are useful in explaining the present invention;

FIGURE 1*a* is a sectional view of a typical negative resistance type semiconductor diode utilized in the present invention;

Figures 1, 1A, 2, 3, 4, 5, 6, 7, 8:
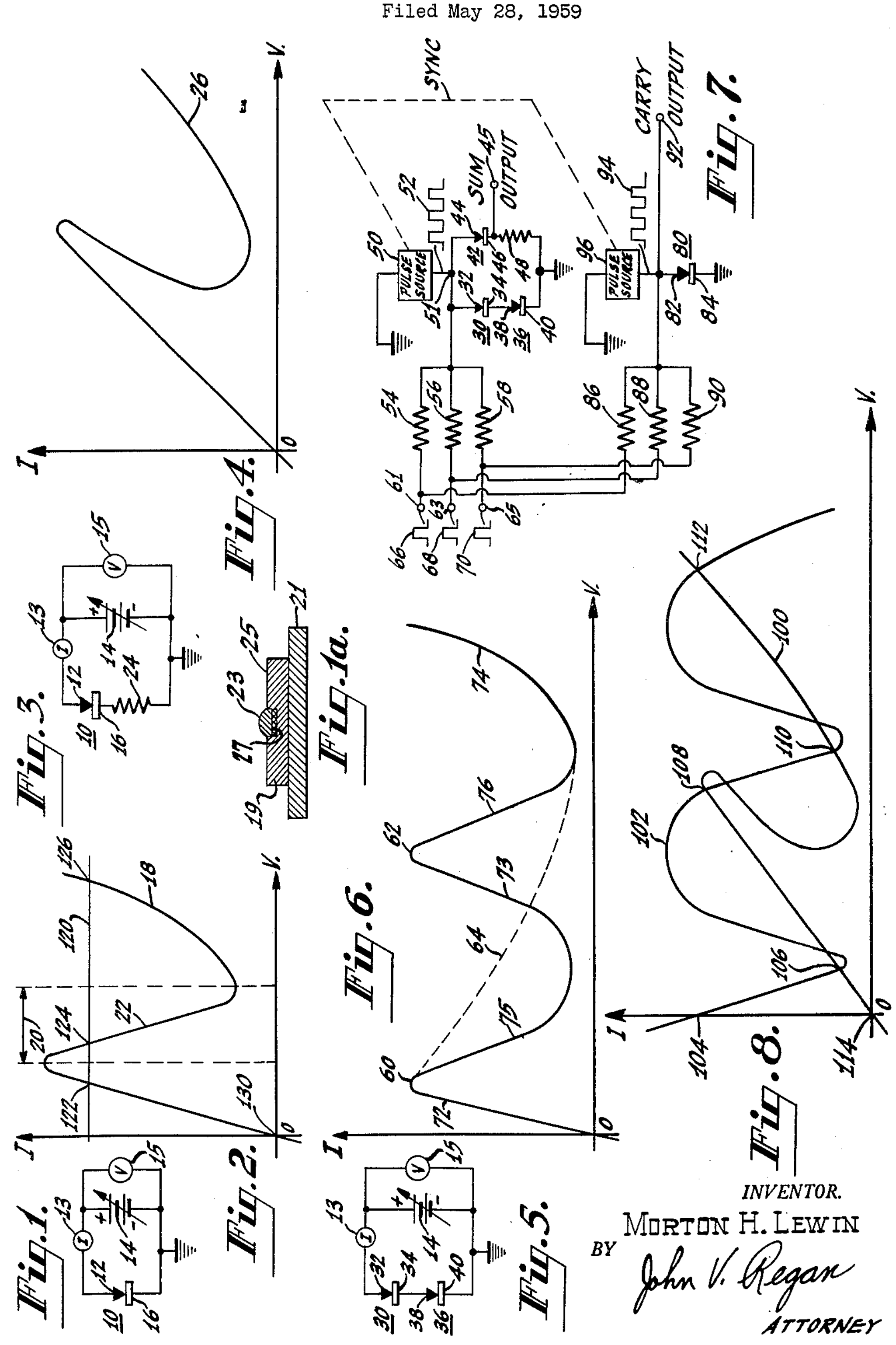
FIGURES 2, 4 and 6 are graphs showing the volt-ampere characteristics of the circuits of FIGURES 1, 3 and 5, respectively.
FIGURE 7 is a schematic diagram of a full adder circuit in accordance with the present invention.
FIGURE 8 is a graph showing certain volt-ampere characteristics of the circuit of FIGURE 7.

FIGURE 1 shows a semiconductor diode 10 having an anode electrode 12 connected through an ammeter 13 to the positive terminal of a variable voltage bias battery 14 with the negative terminal of the bias battery connected to circuit ground. A cathode electrode 16 of the semiconductor diode 10 is also connected to ground. The diode is thereby forward biased in the conventional manner. The battery voltage is measured by a voltmeter 15 connected across the terminals of the battery 14.

FIGURE 1*a* shows a sectional view of a typical negative resistance diode which may be fabricated as follows: A single crystal bar of n-type germanium is doped with arsenic to have a donor concentration of $4.0\times10^{19}$ cm.$^{-3}$ by methods conventional in the semiconductor art. This may be accomplished, for example, by pulling a crystal from molten germanium containing the requisite concentration of arsenic. A wafer 19 is cut from the bar along the 111 plane, i.e. a plane perpendicular to the 111 crystallographic axis of the crystal. The wafer 19 is etched to a thickness of about two mils with a conventional etch solution. A major surface of this wafer 19 is soldered to a strip 21 of nickel, with a conventional lead-tin-arsenic solder, to provide a non-rectifying contact between the wafer 19 and the strip 21. The nickel strip 21 serves eventually as a base lead. A five mil diameter dot 23 of 99 percent by weight indium, 0.5 percent by weight zinc and 0.5 percent by weight gallium is placed with a small amount of a commercial flux on the free surface 25 of the germanium wafer 19 and then heated at 450° C. for one minute in an atmosphere of dry hydrogen to alloy a portion of the dot to the free surface 25 of the wafer 19, and then cooled rapidly. In the alloying step, the unit is heated and cooled as rapidly as possible so as to produce an abrupt p-n junction 27. The unit is then given a final dip etch for five seconds in a slow iodide etch solution, followed by rinsing in distilled water. A suitable slow iodide etch is prepared by mixing one drop of a solution comprising 0.55 gram potassium iodide and 100 cm.$^3$ water in 10 cm.$^3$ of a solution comprising 600 cm.$^3$ concentrated nitric acid, 300 cm.$^3$ concentrated acetic acid and 100 cm.$^3$ concentrated hydrofluoric acid. A pigtail connection may be soldered to the dot where the device is to be used at ordinary frequencies. Where the device is to be used at high frequencies, contact may be made to the dot with a low impedance lead. In a 50 ohm line, the unit can be switched from the low voltage to the high voltage state or from the high to the low voltage state in less than 2 millimicroseconds.

FIGURE 2 shows a volt-ampere characteristic 18 which is typical of a forward biased negative resistance diode such as described above when in the circuit of FIGURE 1 and when utilized in the present invention. The characteristic curve 18 is composed of a negative resistance portion interposed between two positive resistance portions. The two positive resistance portions occur in different voltage regions, one higher than the other. These are both stable operating regions. When the diode is operating in its lower voltage, positive resistance region it is said to be in its "low voltage state" and when it is operating in its higher voltage, positive resistance operating region, it is said to be in its "high voltage state." This type of semiconductor diode is termed herein a "tunnel" diode. Tunnel diodes are more fully described in the copending application of H. S. Sommers, Jr., Serial Number 789,286, filed January 27, 1959, for "Semiconductor Devices and Methods of Preparation Thereof" and assigned to the same assignee as that of the present invention. Tunnel diodes are also known as "dener" diodes.

The characteristic curve 18 in FIGURE 2 is a plot of the voltage across the tunnel diode 10 in the circuit of FIGURE 1 as a function of the current through it, measured as indicated in FIGURE 1. The region between the dotted lines 20 in FIGURE 2 demarcates a portion 22 of the curve 18 having a negative resistance. Generally speaking, negative resistance devices having this type of characteristic, that is, devices which can assume one of two stable values of voltage at a given level of input current are known as "voltage controlled" negative resistance devices.

FIGURE 3 shows the same tunnel diode 10 with a small resistance 24 inserted in series therewith. The combination is connected through the ammeter 13 to a variable voltage bias battery 14 so that the tunnel diode is again forward biased. The bias voltage is measured by the voltmeter 15 connected across the battery 14. The resistance 24 is selected to be approximately equal to the value of the negative resistance represented by the slope of the portion of the curve 22 over the major portion of the region 20. The composite volt-ampere characteristic of the circuit of FIGURE 3 is obtained by varying the voltage across the diode and its series resistor and measuring the current through them and the voltages indicated by the meters 13 and 15. The resultant curve 26 is shown in FIGURE 4. The effect of the additional series resistance 24 is to increase the initial slope of the curve 26 and to restrict the negative resistance portion of the characteristic to small segments occurring near the points of inflection of this curve.

FIGURE 5 shows a circuit in which a pair of tunnel diodes 30 and 36 are series connected in the same sense and forward biased by the variable voltage bias battery 14. The anode electrode 38 of the tunnel diode 36 is, therefore, connected to the cathode electrode 34 of the tunnel diode 30. The anode electrode 32 of the tunnel diode 30 is connected through the ammeter 13 to the positive terminal of the battery 14 and the cathode electrode 40 of the tunnel diode 36 is connected to the negative terminal of this battery.

FIGURE 6 shows the volt-ampere characteristic for the circuit of FIGURE 5. If the tunnel diodes 30 and 36 were exactly identical, a curve would be obtained comprising positive resistance portions 72 and 74 and a negative resistance portion 64 shown in dotted lines connected therebetween. However, in practice, the curve shown therein has positive resistance portions 72, 73 and 74 between which are interposed negative resistance portions 75 and 76. Two peaks 60 and 62 also characterize this curve. A curve of this type is obtained if the two series connected tunnel diodes 30 and 36 are not exactly identical, in which case one of the tunnel diodes always goes through its negative resistance region before the other. In other words, as the forward current is increased to a value slightly greater than that of the lower of current peaks 60 and 62, the diode with the lower peak switches from its low to its high voltage state, whereas the other diode remains in its low voltage state. The pair of diodes then operate in the positive resistance operating region 73. As the forward current is increased further to a value slightly greater than that of the higher of current peaks 60 and 62, the other diode switches to the high voltage state and the pair of diodes then operate in the positive resistance operating region 74 (both diodes in the high state). Since it is practically impossible to obtain tunnel diodes which are exactly identical, this type of curve is always obtained in practice. This double peaked characteristic is used to advantage for the purposes of the present invention. By utilizing the tunnel diode circuits having the characteristics of FIGURE 4 and the double peaked characteristic of FIGURE 6, a binary full adder circuit may be obtained.

FIGURE 7 now shows a schematic circuit diagram of the full adder circuit in accordance with the present invention. This circuit employs four tunnel diodes, three of which are used in a first part of the circuit to provide a sum output, and another tunnel diode which is used in a second part of the circuit to provide a carry output. That part of the circuit in which the sum output signal is derived utilizes in one branch of a parallel circuit the two series connected tunnel diodes 30 and 36, and, in the other branch of the parallel circuit, a tunnel diode 42 and its associated series resistor 48. These two parallel branches of the circuit and their volt-ampere characteristics correspond respectively to the circuits of FIGURES 3 and 5, except for the voltage supply. In the circuit shown in FIGURE 7, the two tunnel diodes 30 and 36 together act as the load impedance for the tunnel diode 42 and its series resistor 48.

In FIGURE 7, the anode electrode 38 of the tunnel diode 36 is directly connected to the cathode electrode 34 of the tunnel diode 30. Further, the anode electrodes 32 and 44 of the tunnel diodes 30 and 42 are directly connected together at a junction 51. The cathode electrode 46 of the tunnel diode 42 is connected through a resistor 48 to circuit ground, and the cathode electrode 40 of the tunnel diode 36 is also connected to circuit ground. A sum output terminal 45 is connected with the ungrounded end of the resistor 48 at the junction of the cathode 46 of the tunnel diode 42 and the resistor 48. The sum output signal developed at the output terminal 45 may be used directly, or it may be applied to other logic circuits, or both.

In place of the battery type power supplies shown in the circuits discussed heretofore, a pulse type energizing supply source 50 is shown. Energizing pulses such as are illustrated by the waveform at 52 are applied by the pulse source 50 to the common junction 51. Since the tunnel diodes are essentially low impedance devices, it is preferable that the power supply 50 be of the constant current type. In addition, if this adder circuit is to be cascaded with other logic circuits which also utilize tunnel diodes, means are provided to insure that the binary signals are transferred in the desired direction. For example, one terminal may serve as both input and output terminals, with means for making the circuit directional so that the binary signals propagate from the output of one such circuit to the input of another. One method of achieving the desired directional effect is to separate input and output functions in time by use of a sequential energizing system. Thus, a pulsed type power supply is used in place of the battery type supplies shown heretofore.

This method of using a pulsed type power supply is explained in more detail in the copending application of M. H. Lewin, Serial Number 795,093, filed February 24, 1959, for "Switching Systems," and assigned to the same assignee as that of the present invention.

The input signals to be added are applied through three input resistors 54, 56 and 58, each of which has one terminal connected to the common anode junction 51 of the tunnel diodes 30 and 42. The remote ends of the input resistors are connected to terminals 61, 63, and 65, to which pulse type binary signals, such as are shown at 66, 68 and 70 are applied. The presence of a pulse 66, 68 or 70 represents the binary digit one and its absence the binary digit zero.

A circuit for generating a carry signal comprises another tunnel diode 80 having an anode electrode 82 and a cathode electrode 84. The cathode electrode 84 is connected to circuit ground and binary input signals are applied to the anode electrode 82 through another three input resistors 86, 88 and 90. Each of the resistors 86, 88 and 90 has a first terminal connected to the anode electrode 82 and a second terminal connected respectively to the input terminals 61, 63 and 65. Thus, the binary input signals are simultaneously applied to the sum generating and the carry generating portions of the circuit. A carry output signal is obtained at a terminal 92 connected with the anode electrode 82 of the tunnel diode 80. The carry output signal is normally applied to another adder circuit, and not used directly. Pulse type energizing signals such as are illustrated at 94 are applied by a pulse generator 86 connected with the anode electrode 82 of the tunnel diode 80. This pulse energizing source 96 may be similar to the pulse source 50 discussed heretofore and both are driven in synchronism.

In practice, both of the energizing sources 50 and 96 may be derived from a common voltage source which may then be arranged by means known in the art to provide two constant current energizing sources.

The operation of the circuit shown in FIGURE 7 can be better understood by first referring to the graph of FIGURE 8 in which the characteristics of the two parallel branches of the circuit of FIGURE 7 have been drawn. The curve 100 represents the volt-ampere characteristic of the series circuit consisting of tunnel diode 42 and resistor 48 and shown heretofore in FIGURE 4. The curve 102 represents the volt-ampere characteristic of the two series connected tunnel diodes 30 and 36 which in this circuit now act as a load impedance element for the tunnel diode 42 and the series resistor 48. Accordingly, the curve 102 is inverted and shifted vertically in the graph of FIGURE 8 as compared to its position in the graph of FIGURE 6. This transposition of the curve 102 is similar to that obtained when drawing a load line on the graph of a vacuum tube characteristic, for example. The point of intersection 104 of the curve 102 with the current axis is determined by the amplitude of the current energizing pulses 52. The amplitude of the energizing pulses is adjusted so that four stable intersection points 106, 108, 110 and 112 are obtained between the curves 100 and 102. The amplitude of the energizing pulses may be adjusted by means located within the generator 50. The intersection points are stable if they occur in the positive resistance regions of both the curves 100 and 102. Intersection points in the negative resistance regions are unstable. The positive resistance regions are defined as those regions in the curves of FIGURES 4 and 6 which have positive slopes.

In operation, consider first that portion of the adder circuit which provides the sum output signal. In the absence of both an energizing pulse and a binary input pulse, the currents and voltages applied to the adder circuit are zero. The circuit then sits at a point corresponding to the origin of the graph of FIGURE 8. An energizing pulse, such as shown by the waveform 52 is now applied to the circuit in synchronism with the binary input signals. For the condition that three binary zero input signals (no pulses) are applied to the input terminals 61, 63 and 65, the operating point of the circuit moves to the point 106 and is stable there. At this operating point, the three diodes 30, 36, 42 are in their low voltage states, the voltage at junction 51 is relatively low, and the current flowing through the load resistor 48 is relatively low, thus providing a relatively low voltage or a "zero" at the sum output terminal 45. When the energizing pulse is terminated, the currents and voltages applied to the circuit again become zero and the adder circuit returns to the point 114 corresponding to the origin of the graph of FIGURE 8.

If now an energizing pulse is again applied to the adder circuit, and one of the three input signals is now a binary "one" while the other two are binary "zeros," there is an additional input current due to this binary "one" which temporarily shifts the load curve 102 vertically by a sufficient amount so that an intersection point no longer occurs at the point 106, but instead occurs at the point 108. As can be seen from the figure, at operating point 108, one of the diodes 30 and 36 is in its low voltage state and the other is in its high voltage state, whereas diode 42 remains in its low voltage state. Thus, there is a relatively high voltage at junction 51, a relatively low voltage drop across diode 42, and a relatively high current through the load resistor 48 and diode 42, whereby a relatively high voltage or a binary "one" appears at the output terminal 45. Upon termination of the energizing pulse and the binary input signal, the circuit again returns to the point 114.

In a similar manner, when an energizing pulse is applied to the circuit, and in synchronism therewith, two binary "one" input signals are applied, with the other input signal being a binary "zero"; there is then sufficient input current to temporarily shift the load curve 102 vertically by a sufficient amount to move the stable operating point from the point 114 to the point 110. That is, the load curve 102 is raised vertically a sufficient amount so that there are no longer the intersection points 106 and 108, and the first stable intersection point is the point 110. Put another way, at operating point 110, one of diodes 30 and 36 remains in its low voltage state and the other in its high voltage state, but diode 42 switches to its high voltage state 100. When diode 42 switches to its high voltage state, its voltage increases and the voltage across resistor 48 decreases, whereby the operating point 100 is at a low voltage and corresponds to a "zero" sum output signal. Upon termination of both the energizing signals and the binary input signals the circuit once again returns to the point 114.

Finally, if three binary "one" input signals such as are shown by the waveforms 66, 68 and 70 are applied to the input terminals 61, 63 and 65, and simultaneously therewith an energizing pulse is applied to the circuit by the pulse source 50, then sufficient current flows through the two series connected tunnel diodes 30 and 36 to effectively shift the load curve 102 vertically by an amount such that the only stable operating point now occurs essentially at the point 112. At this operating point, diodes 30, 36 and 42 are all in their high voltage states, whereby the voltage at terminal 51 increases and the current through and voltage across the resistor 48 also increase. The sum output signal at the terminal 45 is again a binary "one." Upon termination of the binary input and energizing signals, the circuit again returns to the point 114. It is thus seen that in operation the circuit always starts initially at the point 114, and that the energizing pulses and the binary input signals control the number of stable intersections between the load curve 102 and the curve 100.

The operation of the circuit may be summarized in tabular form as follows:

| No. of Binary "One" Inputs | Sum Output |
|---|---|
| 0 | 0 |
| 1 | 1 |
| 2 | 0 |
| 3 | 1 |

This operation fulfills the sum function of a full adder.

The binary input signals which are applied to the sum portion of the circuit are also simultaneously applied to the carry portion of the circuit. The carry circuit is arranged to provide a "one" output when the number of binary input "ones" is two or greater. That is, with only a single binary "one" input, diode 80 remains in its low voltage state and the carry circuit provides a binary "zero" output; two or three concurrently applied binary "one" input signals have an amplitude together sufficient to switch the diode to its high voltage state and the carry output is a binary "one."

Referring to FIGURE 2, the operation of the carry circuit may be explained. The curve 18 shows the volt-ampere characteristic of the tunnel diode 80. Since a constant current pulse energizing source 96 is utilized, a substantially horizontal load line 120 is obtained and intersects the curve 18 in three points, namely 122, 124 and 126. The operating points 122 and 126 occur in positive resistance regions of the curve 18 and are thus stable, while the operating point 124 occurs in a negative resistance region and is thereby unstable.

By properly adjusting the amplitude of the energizing pulses, the circuit is arranged to operate as a threshold gate to provide the desired carry output signal. In the absence of an energizing pulse of any binary input pulses, the circuit operating point may be considered to be the origin of the graph of FIGURE 1 or the point 130. If an energizing pulse is applied to the tunnel diode 80 by the energizing source 96, and simultaneously therewith, three binary "zeros" are applied to the input terminals 61, 63 and 65, the stable operating point becomes the point 122. At this point, the voltage at the carry output terminal is relatively low, corresponding to a binary "zero" as the carry. Upon termination of the energizing pulse, the circuit returns to the point 130.

When a binary "one" input signal is applied to only one of the input terminals, and an energizing pulse is synchronously applied to the tunnel diode 80, then the additional current applied to the tunnel diode by the input signal causes the load line 126 to temporarily shift vertically but by less than the amount necessary for it to reach the peak of operating characteristic curve 18. Thus the output voltage at the carry output terminal 92 still remains relatively low, corresponding again to a binary "zero." Upon termination of the energizing pulse and the binary input pulse, the carry circuit returns to the point 130.

When two or more binary "ones" are applied to the tunnel diode 80 in synchronism with an energizing pulse, sufficient additional current is applied to the tunnel diode to effectively shift the load line 120 to the peak of the characteristic curve 18, thus causing the operating point to rapidly switch from a point in the low voltage operating region to a point such as 126 in the high voltage operating region. The point 126 corresponds to a condition of high output voltage at the carry output terminal 92 corresponding to a binary "one" carry signal. At the termination of the energizing pulse and the binary input signal, the circuit once again returns to the point 130.

Thus, only when an energizing pulse and two or more binary input signals are applied to the tunnel diode 80 in the carry circuit is the carry output signal a binary "one," otherwise the carry output signal is a binary "zero." Therefore, the carry function is properly performed in this full adder circuit.

There has thus been shown and described a novel full adder circuit utilizing a plurality of negative resistance type semiconductor diodes. The circuit shown is relatively simple, performs the full adder function in a single stage and operates at high speed. Circuits of this type are very useful for digital computers or other digital information handling machines.

What is claimed is:

1. In combination, a pair of input terminals; first and second voltage controlled negative resistance elements connected in series between said terminals; a third negative resistance element in series with an output means connected between said terminals, all of said negative resistance elements being poled to conduct forward current in the same direction; constant current means connected to said terminals for applying current pulses thereto; and means for deriving an output signal from said output means.

2. In the combination as set forth in claim 1, said negative resistance elements comprising tunnel diodes.

3. In the combination as set forth in claim 1, said output means comprising a resistor and said means for deriving an output signal comprising a pair of terminals connected across said resistor.

4. In a binary adder, a pair of input terminals; two circuits connected in parallel between said input terminals one including first and second voltage controlled negative resistance elements connected in series and poled in the same direction, and the other including a third voltage controlled negative resistance element in series with an output means, said third element being poled in the same direction as the first and second elements; constant current circuit means for applying a desired number of concurrent information pulses to said terminals; constant current circuit means for applying energizing pulses to said terminals concurrently with said information pulses; a fourth voltage controlled negative resistance element; and means for applying the same information and energizing pulses to said fourth element as to said input terminals.

5. In combination, a first circuit including two voltage controlled negative resistance elements connected in series; a second circuit connected in parallel across said first circuit including a third voltage controlled negative resistance element and a resistance element connected in series, all of said negative resistance elements being poled in the same direction; means for applying energizing current pulses to said parallel connected circuits at a level such that all of said elements are in their low voltage state; and means for applying information pulses to said parallel connected circuits concurrently with said energizing pulses and a level such that one said information pulse places an element in said first circuit in its high voltage state, two said information pulses place an element in said first circuit and the negative resistance element in said second circuit in their high voltage state and three such information pulses place all negative resistance elements in their high voltage state.

6. The circuit of claim 5, further including a fourth negative resistance element and means for applying said information and energizing pulses to said fourth element at a level such that one such information pulse places said element in its low voltage state and two or three such information pulses place said element in its high voltage state.

7. A circuit comprising, in combination, a first series circuit including a first and a second voltage controlled negative resistance semiconductor device connected in series, a second series circuit including a third voltage controlled negative resistance semi-conductor device and an impedance element connected in series, and a pair of terminals between which said first and second series circuits are connected in parallel, all of said devices being poled in the same sense from one of said terminals to the other.

8. In combination, a voltage controlled negative resistance diode; an impedance connected in series with the diode; a substantially constant current source connected across said series circuit; and a pair of signal terminals across said impedance.

9. In combination, a pair of branch circuits connected in parallel between two input terminals, one including first and second voltage controlled negative resistance diodes in series, and the other including a third voltage controlled negative resistance diode and a load in series, all of said diodes being poled to conduct current in the same direction between said terminals.

10. In combination, a pair of branch circuits connected in parallel between a pair of input terminals, one of said circuits including first and second voltage controlled negative resistance diodes connected in series and the other including a third voltage controlled negative resistance diode and load impedance connected in series, all of said diodes being connected to conduct current in the same direction between said terminals; and means for applying concurrently to said terminals an operating current and none, one, two or three signal pulses, the circuit parameters being such that said operating current is insufficient to switch any diode to its high voltage state, the operating current and one applied pulse place said first diode in its high voltage state, the operating current and two applied pulses place said first and third diodes in their high voltage state, and the operating current and three applied pulses place said first, second and third diodes in their high voltage state.

11. In the combination as set forth in claim 10, further including a fourth voltage controlled negative resistance diode; and means coupling said fourth diode to said terminals, said coupling means and fourth diode having parameters such that the operating current and one concurrently applied signal pulse are insufficient to switch said fourth diode to its high voltage state, and the operating current and two or three concurrently applied signal pulses are sufficient to switch said fourth diode to its high voltage state.

12. In combination, a tunnel diode; a resistor connected in series with the diode; a substantially constant current source connected across the series circuit; and a pair of signal terminals connected across said resistor.

13. In combination, a tunnel diode; a resistor connected in series with the tunnel diode; a substantially constant current source connected across said series circuit; a pair of output signal terminals connected across said resistor; and an input signal terminal connected to the series circuit between the tunnel diode and the current source.

References Cited in the file of this patent

FOREIGN PATENTS 1,179,248 France ------------------ Dec. 22, 1958